United States Patent [19]

Falkinger et al.

[11] 4,017,246

[45] Apr. 12, 1977

[54] CONVEYOR PLATE FOR WET SHEETS OR DRY SHEETS

[75] Inventors: Willard Falkinger, Farsta; Per Anders Åsberg, Taby, both of Sweden

[73] Assignee: Defibrator Aktiebolag, Stockholm, Sweden

[22] Filed: Oct. 17, 1975

[21] Appl. No.: 623,533

[30] Foreign Application Priority Data

Oct. 23, 1974 Sweden ............................ 7413343

[52] U.S. Cl. ................................ 425/338; 425/86; 425/406; 100/196

[51] Int. Cl.[2] ........................................ B29C 3/00

[58] Field of Search ............. 425/338, 339, 84, 85, 425/86, 406; 100/196

[56] References Cited

UNITED STATES PATENTS

| | | | |
|---|---|---|---|
| 3,824,058 | 7/1974 | Axer et al. | 425/338 |
| 3,860,381 | 1/1975 | Pesch | 425/338 |

*Primary Examiner*—Robert L. Spicer, Jr.
*Attorney, Agent, or Firm*—Eric Y. Munson

[57] ABSTRACT

A pressure plate assembly for hardboard presses in which a thin metal sheet for supporting the material to be compressed into hardboard is inserted between the pressure plates. The thin metal sheet extends beyond the edges of the press plates and is bent downwardly along two opposing sides thereof to impart substantial rigidity to the overhanging portions and to provide a draining surface for the compressed material. The other two opposing edges of the metal sheet form projections having thickened reinforcement edges.

1 Claim, 2 Drawing Figures

CONVEYOR PLATE FOR WET SHEETS OR DRY SHEETS

BACKGROUND OF THE INVENTION

This invention relates to a conveyor plate having elongated rectangular shape for supporting sheets of cellulose or fibre material or shavings in wet or dry condition for hot pressing between the press plates in a multi-stage press.

It is known in the manufacture of sheets or board units of cellulose or fibre material or shavings by means of heat and pressure treatment of the sheets in the interspaces between the press plates of a multi-stage press to utilize conveyor plates. In the manufacture of board units according to the wet method the wet sheets and also the finished sheets or board units are conveyed between different treatment stations. Present between a sheet and a conveyor plate is normally a wire cloth which is adapted to facilitate the removal of water which during the treatment is squeezed out from the sheet. However, problems arise in connection with the drainage of the water from the conveyor plate proper, since the squeezed out water tends to remain on the conveyor plate adjacent the longitudinal edges of the wet sheet lying on said plate.

SUMMARY OF THE INVENTION

Therefore, one main object of the invention is to provide a conveyor plate of the kind defined above the shape of which promotes the drainage of water squeezed out from the wet sheet supported by the conveyor plate.

A further object of the invention is to provide a conveyor plate which in addition to promoting the discharge of the water during the pressing operation possesses improved stiffness qualities.

A still further object of the invention is to provide a conveyor plate of the kind in consideration which permits perfect control of the plate under treatment, especially when it is used in a multiple opening press.

These objects are attained, according to a main feature of the invention, by utilizing a thin steel plate the longitudinal edge portions of which at least along the major portion of their length are bent downwards. The thickness of the plate, to which the invention is applicable most suitably, is about 1.2 mms.

A still further object of the invention is to provide a conveyor plate possessing improved stiffness properties in transverse direction. According to another important feature of the invention the plate is provided with reinforcing edge strips along its transverse edges. These edge strips reduce wear on the plate during its advance on the conveyor track which may be a belt conveyor. The edge strips which preferably consist of straight rules of metal are suitably secured onto the top side of the conveyor plate between the longitudinal outer edges thereof.

Further objects, features and advantages of the invention will become apparent from the following desciption of a preferred embodiment, with reference to the accompanying drawing which forms part of this specification and of which:

BRIEF DESCRIPTION OF THE DRAWINGS

In both drawing figures corresponding details are denoted by the same reference numerals.

DESCRIPTION OF A PREFERRED EMBODIMENT OF THE INVENTION

Figure 1:
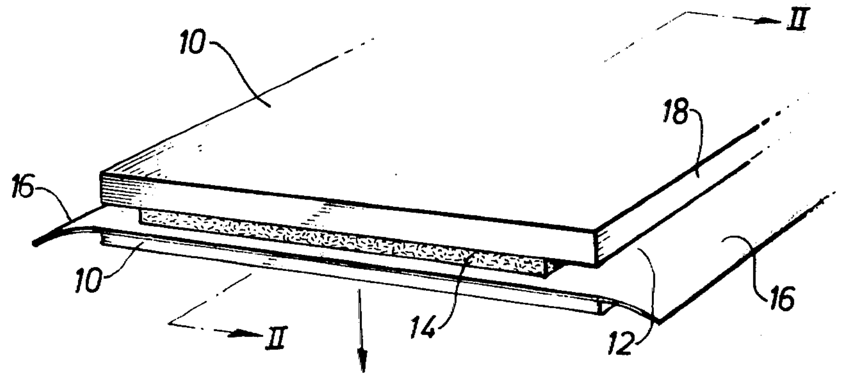
FIG. 1 is a perspective view of a portion of two press plates in a multiple opening press and a conveyor plate located therebetween and supporting a sheet deposited thereon.

Referring now to FIG. 1, there are illustrated two press plates 10 for use in a multi-stage press. The press is not shown nor are the press plates which are stacked in the press since the latter are conventional in the art and do not form part of the invention. Inserted between the illustrated press plates 10 is a conveyor plate 12 shaped according to the invention and supporting a sheet 14 intended to be compressed into a board. No wire cloth is shown in the drawing. The two longitudinal lateral edge portions 16 of the conveyor plate 12 are bent downwards slightly, so that water squeezed out from a sheet 14 easily can drain off sideways. It should be observed that each bent-down portion begins outside or immediately adjacent the lateral edges 18 of the press plates 10 so that that portion of the conveyor plate 12 which lies between the press plates 10 is always maintained in a planar condition.

Figure 2:
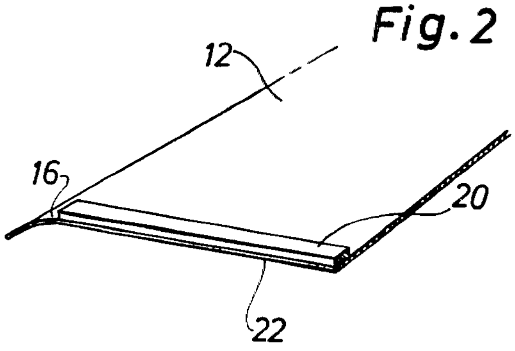
FIG. 2 is a perspective view of a section taken along the line II—II in FIG. 1, showing a portion of the conveyor plate only with a reinforcing edge strip applied thereon.

By bending the longitudinal plate edge portions 16 downwardly the conveyor plate 12 acquires stiffening in longitudinal direction. For the purpose of ensuring safe handling of the thinnest possible plate 12 it is, however, advisable to provide stiffening means also in the transverse direction of the conveyor plate 12. This means is shown in FIG. 2, where the conveyor plate portion represented in perspective includes a reinforcing edge strip 20. The edge strip 20 is placed adjacent the transverse edge 22 of the conveyor plate 12 and a similar strip (not shown) is applied to the conveyor plate adjacent the opposite, transverse edge (also not shown). The edge strip 20, which preferably is of metal, is secured onto the top side of the conveyor plate 12 between the bent-down edge portions 16, the strip 20 thus in the shown embodiment extending only over the planar portion of the plate 12. Preferably the edge strip 20 is secured by welding or riveting onto the plate. When the conveyor plate 12 is between the press plates 10 of a conventional multi-stage press, the transverse edges 22 of the plate 12 in this embodiment should project slightly beyond the press plates 10 so that the edge strips 20 will always remain totally outside the transverse edges of the press plates 10.

Modifications of the conveyor plate described hereinbefore are possible within the scope of the invention. Thus, the edge strip, for example, may extend over the entire width of the conveyor plate. Then the shape of the ends of the strip should fit to the curvature of the bent edge portion of the conveyor plate. It may also be advantageous to utilize entirely straight edge strips which extend over the whole breadth of the conveyor plate. In the latter case the longitudinal edges of the plate are not bent in the region of the edge strips.

What is claimed is:

1. A pressure plate assembly for hardboard presses comprising a pair of opposite horizontally disposed rectangular pressure plates defined by longitudinal and transverse edges, a thin metal sheet for supporting the mat forming material to be compressed into hardboard inserted between said pressure plates, said thin metal sheet having longitudinal edges and transverse edges conforming to the longitudinal edges and the transverse edges of said pressure plates, said longitudinal edges and said transverse edges of said sheet extending beyond the lateral limits thereof, the portion of said metal sheet extending beyond the longitudinal edge of said pressure plates being bent downward to impart substantial rigidity to said portion and to provide a drainage surface for the material to be compressed while the portion of said sheet between the lateral edges of said pressure plates is maintained in planar condition by said pressure plates, the portion of said metal sheet extending beyond the transverse plates forming horizontally extending projections, said projections having edge members of increased thickness relative to said metal sheet and extending at least coextensively with the transverse edges of said pressure plates.

* * * * *